US009015799B2

(12) United States Patent
Suzuki

(10) Patent No.: US 9,015,799 B2
(45) Date of Patent: Apr. 21, 2015

(54) CONTENT TRANSMITTER, CONTENT TRANSMITTING METHOD AND PROGRAM

(71) Applicant: Panasonic Corporation, Osaka (JP)

(72) Inventor: Junya Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 5 days.

(21) Appl. No.: 13/782,101

(22) Filed: Mar. 1, 2013

(65) Prior Publication Data

US 2013/0239183 A1    Sep. 12, 2013

(30) Foreign Application Priority Data

Mar. 9, 2012    (JP) ................................. 2012-052669
Dec. 19, 2012    (JP) ................................. 2012-276723

(51) Int. Cl.
*H04L 29/06* (2006.01)
*H04L 27/00* (2006.01)
*H04L 1/00* (2006.01)

(52) U.S. Cl.
CPC ................. *H04L 63/10* (2013.01); *H04L 69/16* (2013.01); *H04L 2027/0018* (2013.01); *H04L 1/0033* (2013.01); *H04L 1/0034* (2013.01); *H04L 1/0041* (2013.01)

(58) Field of Classification Search
CPC . H04L 63/10; H04L 69/16; H04L 2027/0018; H04L 1/0033; H04L 1/0034; H04L 1/0041
USPC ...................................................... 726/2, 3, 4
See application file for complete search history.

(56) References Cited

U.S. PATENT DOCUMENTS

| 6,757,283 | B1 | 6/2004 | Yamanaka et al. |
| 2005/0198282 | A1 | 9/2005 | Stahl et al. |
| 2007/0064675 | A1* | 3/2007 | Szucs ............................ 370/352 |
| 2010/0202454 | A1* | 8/2010 | Miller et al. ................... 370/390 |

FOREIGN PATENT DOCUMENTS

| JP | 2000-354067 A | 12/2000 |
| JP | 2001-297063 A | 10/2001 |
| JP | 2005-529519 T | 9/2005 |

* cited by examiner

*Primary Examiner* — Ellen Tran
(74) *Attorney, Agent, or Firm* — Renner, Otto, Boisselle & Sklar, LLP.

(57) ABSTRACT

A content transmitter transmits content over a network, and includes: an input section configured to obtain the content, a first kind of information indicating, based on at least one of the destination and transmission method of the content, whether transmission of the content is permitted or not, and a second kind of information specifying the destination of the content; a control section configured to determine, by reference to the first and second kinds of information, whether or not to transmit the content to the destination and rewrites the first kind of information; and an output section configured to output the content and the first kind of information that has been rewritten.

10 Claims, 9 Drawing Sheets

FIG.5

| TRANSMISSION CONTROL INFORMATION (HEXA-DECIMAL NUMBER) | SAME SUB-NET | | | DIFFERENT SUB-NET | | |
|---|---|---|---|---|---|---|
| | UNICAST | MULTICAST | BROADCAST | UNICAST | MULTICAST | BROADCAST |
| 0x00 | 0 | 0 | 0 | 0 | 0 | 0 |
| 0x20 | 1 | 0 | 0 | 0 | 0 | 0 |
| 0x24 | 1 | 0 | 0 | 1 | 0 | 0 |
| 0x30 | 1 | 1 | 0 | 0 | 0 | 0 |
| 0x38 | 1 | 1 | 1 | 0 | 0 | 0 |
| 0x36 | 1 | 1 | 0 | 1 | 1 | 0 |
| 0x3e | 1 | 1 | 1 | 1 | 1 | 0 |
| 0x3f | 1 | 1 | 1 | 1 | 1 | 1 |

0: PROHIBITED
1: PERMITTED

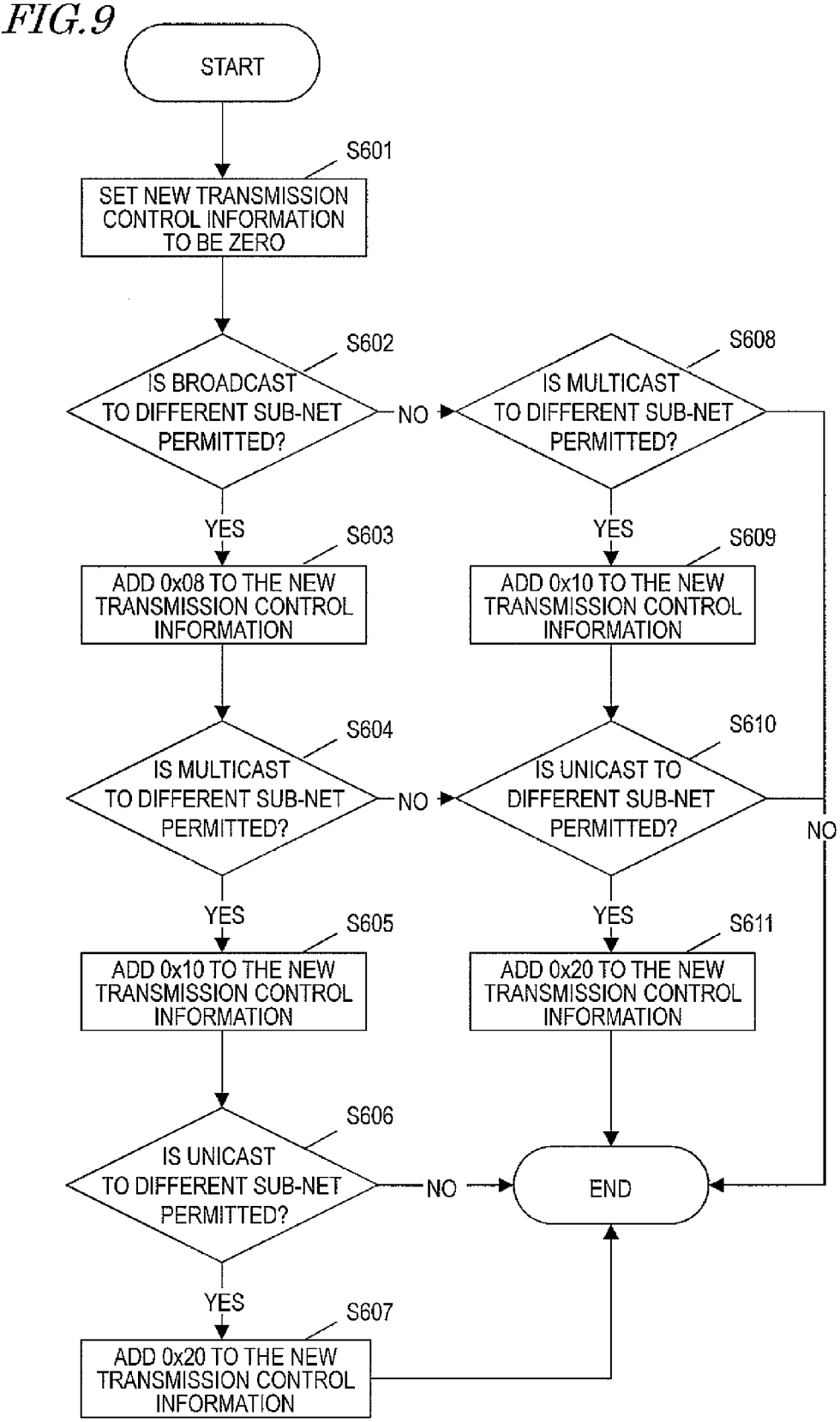

CONTENT TRANSMITTER, CONTENT TRANSMITTING METHOD AND PROGRAM

BACKGROUND

1. Technical Field

The present disclosure relates to a technique for transmitting content over a network.

2. Description of the Related Art

As computer networks have been rapidly developing these days, it has become very easy to transmit some content such as a video clip or an audio file from one computer terminal to another.

However, as such content to transmit often includes sensitive confidential or personal information, there is an increasing demand for safe and secure telecommunications controls that can eliminate the risk of information leaking. Thus, in response to such a demand, various access control systems and methods have been proposed to realize safe and secure telecommunications controls.

For example, Japanese Laid-Open Patent Publication No. 2001-297063 discloses that an access control may be carried out using an ID and a password assigned to each individual user when he or she attempts to transmit some content. On the other hand, Japanese Laid-Open Patent Publication No. 2000-354067 discloses a technique for performing an access control by making a router, which is located between a server and a group of clients, decide whether to relay or discard the given content on a content basis and on a client basis. Furthermore, PCT International Application Japanese National-Phase Patent Publication No. 2005-529519 discloses a technique for performing an access control by providing an authentication field, which indicates either a mode that permits distribution to outside of a network or a mode that prohibits distribution to outside of the network, for content data.

SUMMARY

According to these techniques, however, the access control cannot be carried out flexibly enough depending on the destination or the mode of transmission, and safety of telecommunications cannot always be ensured.

One non-limiting, and exemplary embodiment provides a content transmission technique which contributes to realizing safe and secure telecommunications by carrying out an access control more flexibly than in the related art while attempting to transmit content over a network.

In one general aspect, a content transmitter as an embodiment of the present disclosure transmits content over a network, and includes: an input section configured to obtain the content, a first kind of information indicating, based on at least one of the destination and transmission method of the content, whether transmission of the content is permitted or not, and a second kind of information specifying the destination of the content; a control section configured to determine, by reference to the first and second kinds of information, whether or not to transmit the content to the destination and rewrites the first kind of information; and an output section configured to output the content and the first kind of information that has been rewritten.

According to the above aspect, the access control can be carried out more flexibly than in the related art and content can be transmitted safely and securely over a network.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 5 is a table showing an example of transmission control information according to the first embodiment.

FIG. 9 is a flowchart showing the procedure of determining transmission control information that has been rewritten in a situation where content is transmitted different sub-nets according to the first embodiment.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Before specific embodiments are described, the basic configuration and operation of an embodiment of the present disclosure will be described.

Figure 1:
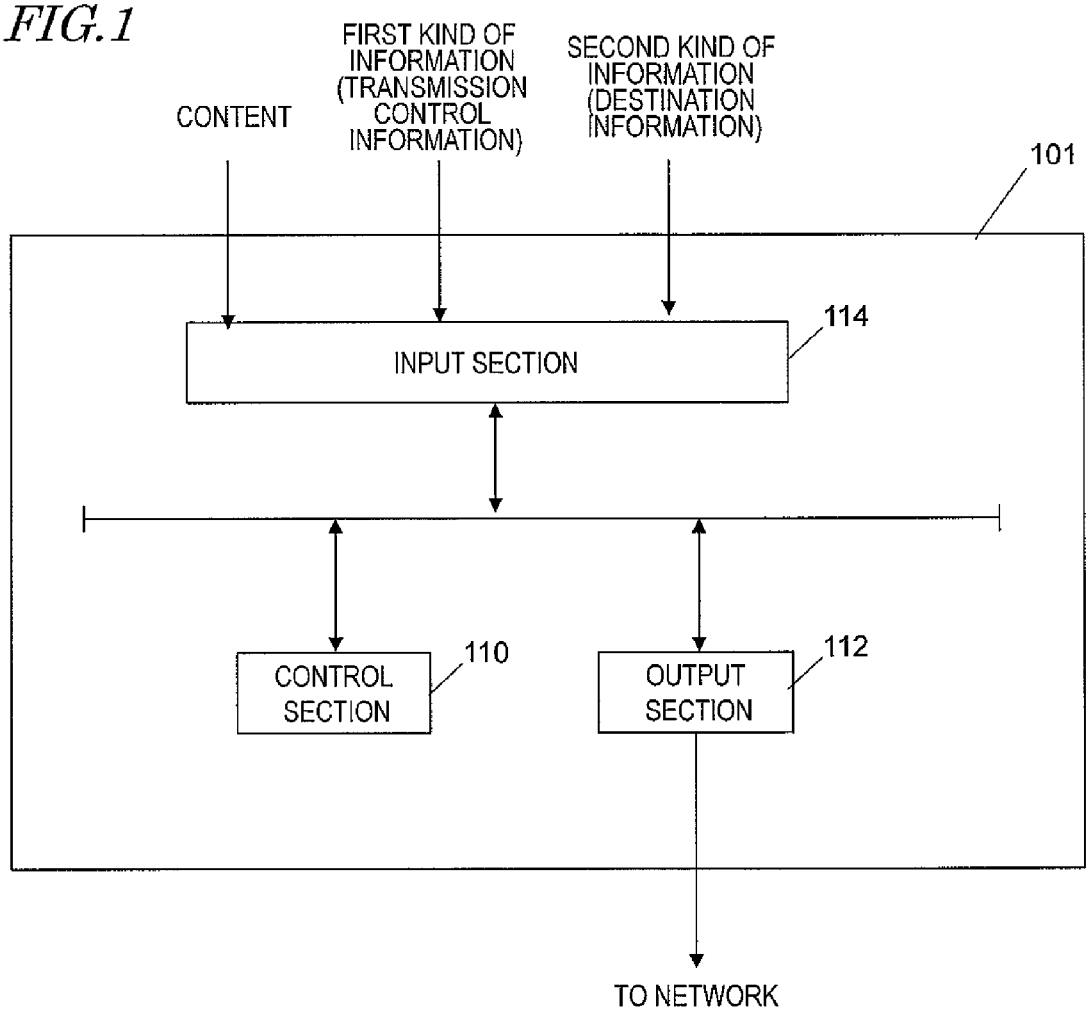
FIG. 1 is a block diagram illustrating a general configuration for a content transmitter as an embodiment.

FIG. 1 is a block diagram illustrating a configuration for a content transmitter 101 as an embodiment. The content transmitter 101 can transmit content over a network and includes an input section 14 which obtains content and other kinds of information, a control section 110 which controls transmission of the content in accordance with the information collected, and an output section 112 which outputs the content to an external device. The network that is supposed to be used in this embodiment is an IPv4 (Internet Protocol Version 4) based TCP/IP network but may also be an IPv6 (Internet Protocol Version 6) based network or any other kind of network.

The input section 114 obtains the content to transmit, a first kind of information indicating, based on at least one of the destination and transmission method of the content, whether transmission of the content is permitted or not (which will be sometimes referred to herein as "transmission control information"), and a second kind of information specifying the destination of the content (which will be sometimes referred to herein as "destination information"). In this description, the "content" refers herein to electronic data such as video, audio or document, the "destination" refers herein to either a device (host) or a network (including a sub-net) to be identified by the address of the destination to which the content is to be transmitted, for example, and the "transmission method" refers herein to the mode of transmission such as unicast, multicast or broadcast in an IPv4 network or the mode of transmission such as unicast, multicast, or anycast in an IPv6 network. By using the transmission control information that is associated with the content to transmit, the control can be carried out so that transmission is permitted to only particular destinations or that only a particular transmission method is permitted. Although the input section 114 is illustrated as a single block in FIG. 1, the input section 114 may also be made up of multiple sections that obtain the content, the transmission control information and the destination information, respectively. Optionally, the content and the transmission control information may be managed as a single aggregated file by adding the transmission control information to the header of content data, for example.

By reference to the transmission control information and destination information obtained by the input section 114, the control section 110 determines whether or not to transmit the content to the destination and rewrites the transmission control information as needed by reference to the transmission control information and the destination information when transmitting the content. The decision whether or not to transmit the content is made based on the contents of the transmission control information, information about the network (or sub-net) of the destination identified by the destination information, and information about the transmission method. The transmission control information is rewritten in accordance with a predetermined transmission control policy so as to conform to the contents of the current transmission control information. It will be described in detail later exactly how the control section 110 performs its control operation.

The output section 112 may be a terminal through which the content and the transmission control information that has been rewritten are output to the destination. In this manner, the content and transmission control information are transmitted to the destination over the network.

Figure 2:
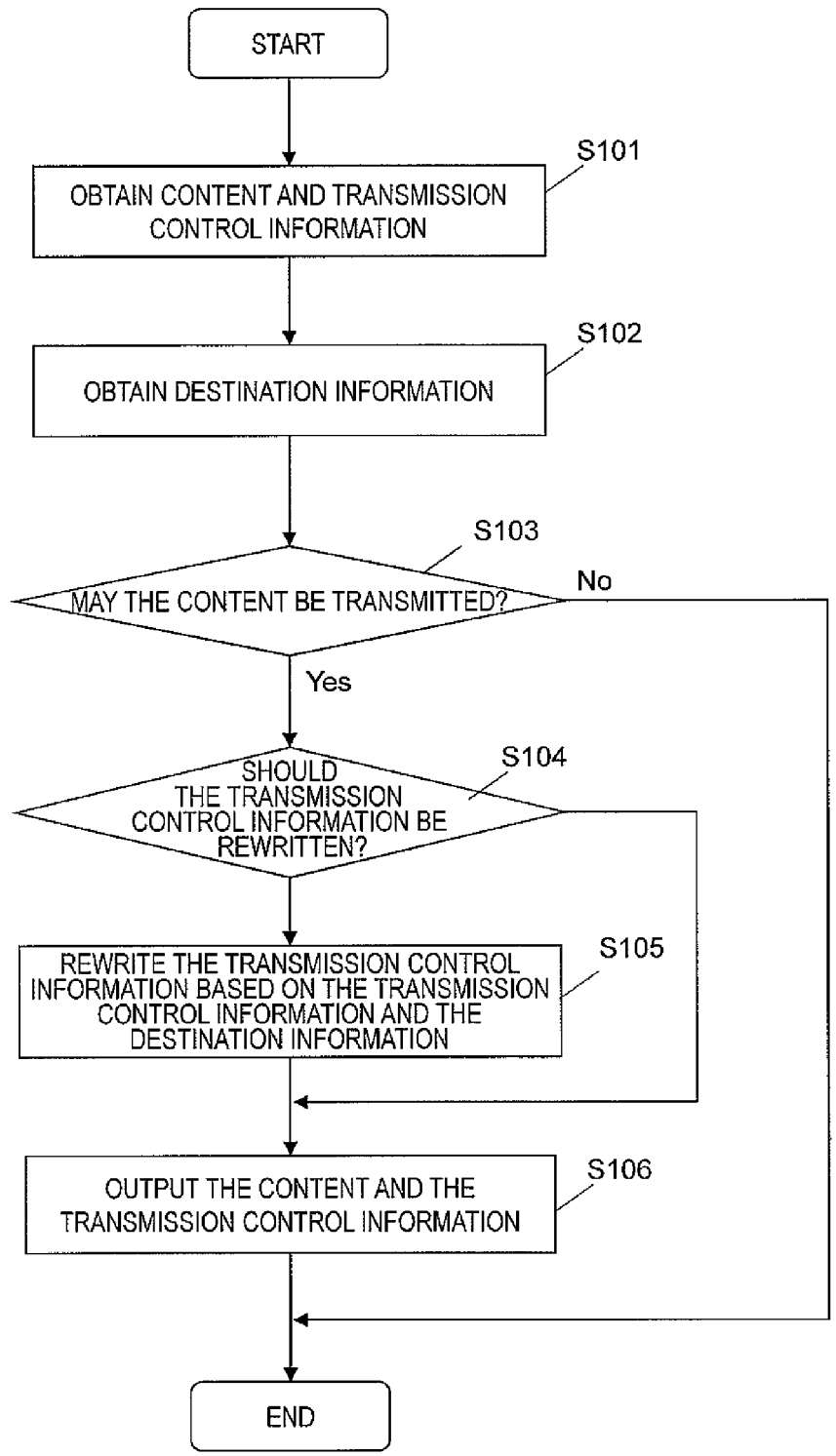
FIG. 2 is a flowchart showing generally how the content transmitter operates according to that embodiment.

FIG. 2 is a flowchart showing generally how this content transmitter 101 operates. First of all, in Step S101, the input section 114 obtains the content and the transmission control information from an external device such as another information processor or storage device. Next, in Step S102, the input section 114 obtains the destination information, which may be entered by the user, for example. Optionally, these processing steps S101 and S102 may be performed in reverse order or in parallel with each other.

Next, in Step S103, the control section 110 determines, by reference to the transmission control information and the destination information, whether or not to transmit the content to the destination specified. If the control section 110 decides that the content not be transmitted, the process ends at this point in time. Or a signal indicating that the content will not be transmitted may be output to an external device. On the other hand, if the control section 110 has decided that the content be transmitted, then the control section 110 determines, in the next processing step S104, whether or not the transmission control information should be rewritten. This decision is made by reference to the transmission control information and the destination information as described above. If the control section 110 has decided that the transmission control information be rewritten, the control section 110 rewrites the transmission control information in Step S105 based on the original transmission control information and the destination information. It will be described later specifically how to rewrite the transmission control information. On the other hand, if the control section 110 has decided in Step S104 that the transmission control information not be rewritten, then this processing step S105 is skipped. Next, in Step S106, the output section 112 outputs the content and the transmission control information to an external device.

By performing these processing steps, the transmission control information that has been sent to the destination is appropriately rewritten by the control section 110, and therefore, it is possible to prevent the third party from getting the content illegally. In this manner, the access control can be carried out more flexibly than in the related art and safe and secure communications are realized.

According to the traditional access control using an ID and a password, safety from secondary transmission cannot be ensured for the client that has received content. For example, if the ID and the password have not been set appropriately by the client who has received the content, then secondary transmission to an unauthorized client may also be permitted. On the other hand, according to the access control in which the router decides to either relay or discard the given content, every content to be relayed and every authorized client should be registered with every router on the route, which is troublesome in the case of a large scale network. Furthermore, according to the access control that provides the content with an authentication field, indicating whether content may or may not be distributed to a user outside of the network, content that should not be distributed to anyone outside of the network never goes out of the network. On the other hand, content that may be distributed to anyone outside of the network will go out of the network freely. That is why it is difficult to carry out the access control flexibly.

However, according to the technique of the present disclosure, such a problem can be overcome. Hereinafter, embodiments of the present disclosure will be described more specifically.

Embodiment 1

A content transmitter as a first embodiment belongs to a TCP/IP network, retrieves content with transmission control information for use to control transmission from an external storage device, rewrites the transmission control information according to the destination, and then outputs the content to the destination IP address. In this case, the transmission control information is rewritten in accordance with the content source's transmission control policy.

1-1. Configuration

Figure 3:
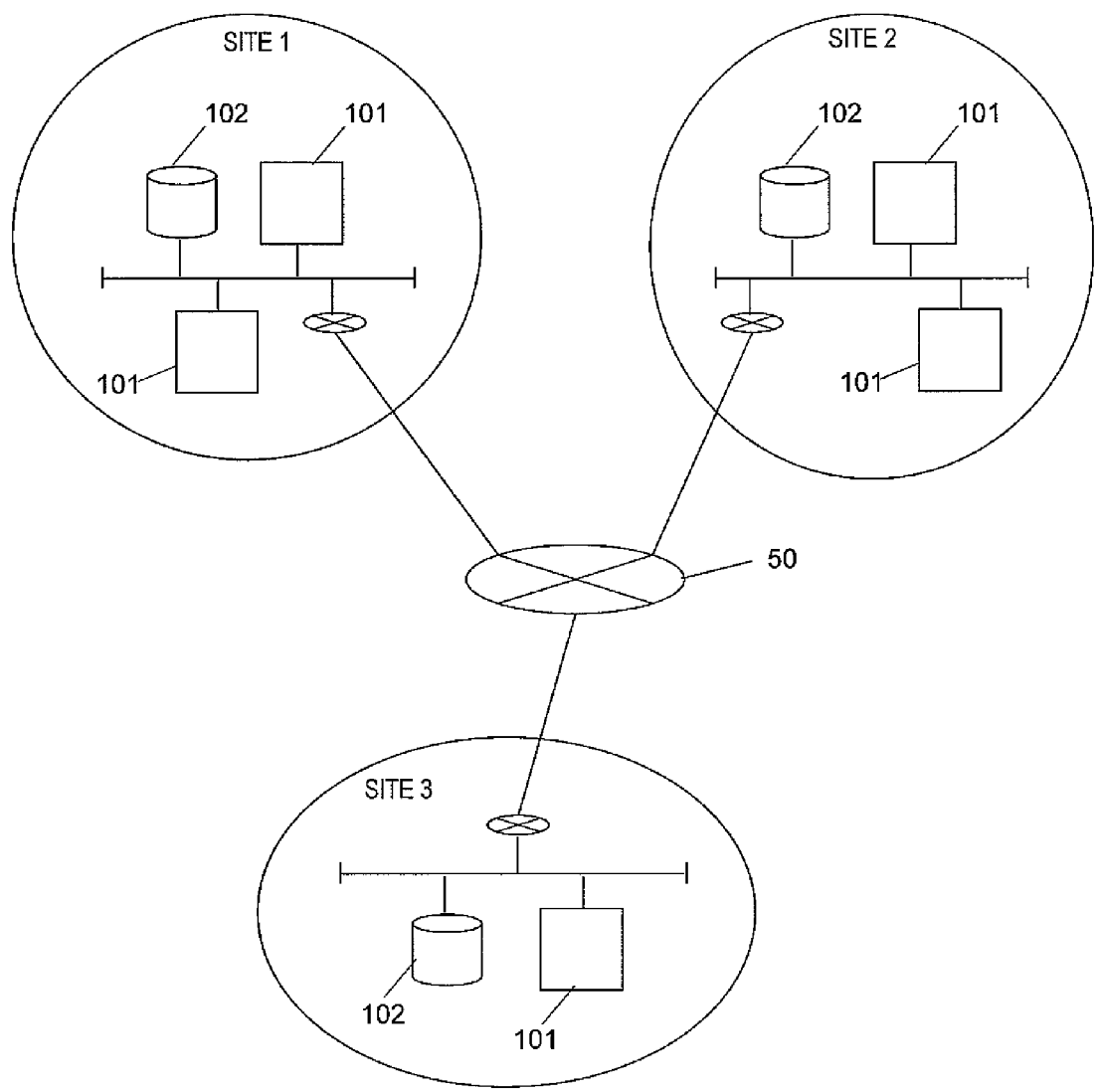
FIG. 3 is a schematic representation illustrating an overall configuration for a network according to a first embodiment.

FIG. 3 is a schematic representation illustrating an overall configuration for a network that uses content transmitters 101 according this embodiment. This embodiment is supposed to be used in a situation where broadcasters such as TV stations communicate video content between their business locations. Sites 1, 2 and 3 shown in FIG. 1 may be three different departments in the same broadcaster, for example. At each of those sites, provided are one or more content transmitters 101 and an external storage device 102. The content transmitters 101 at the respective sites are connected together so as to communicate with each other in accordance with the TCP/IP protocol over the communications network 50. In this example, those sites are supposed to belong to mutually different sub-nets. Each content transmitter 101 at each site can transmit content to another content transmitter 101 belonging to the same or different sub-net or other computers. The content transmitter 101 may be a personal computer (PC) installed in each department or a camcorder for use to create video content.

Figure 4:
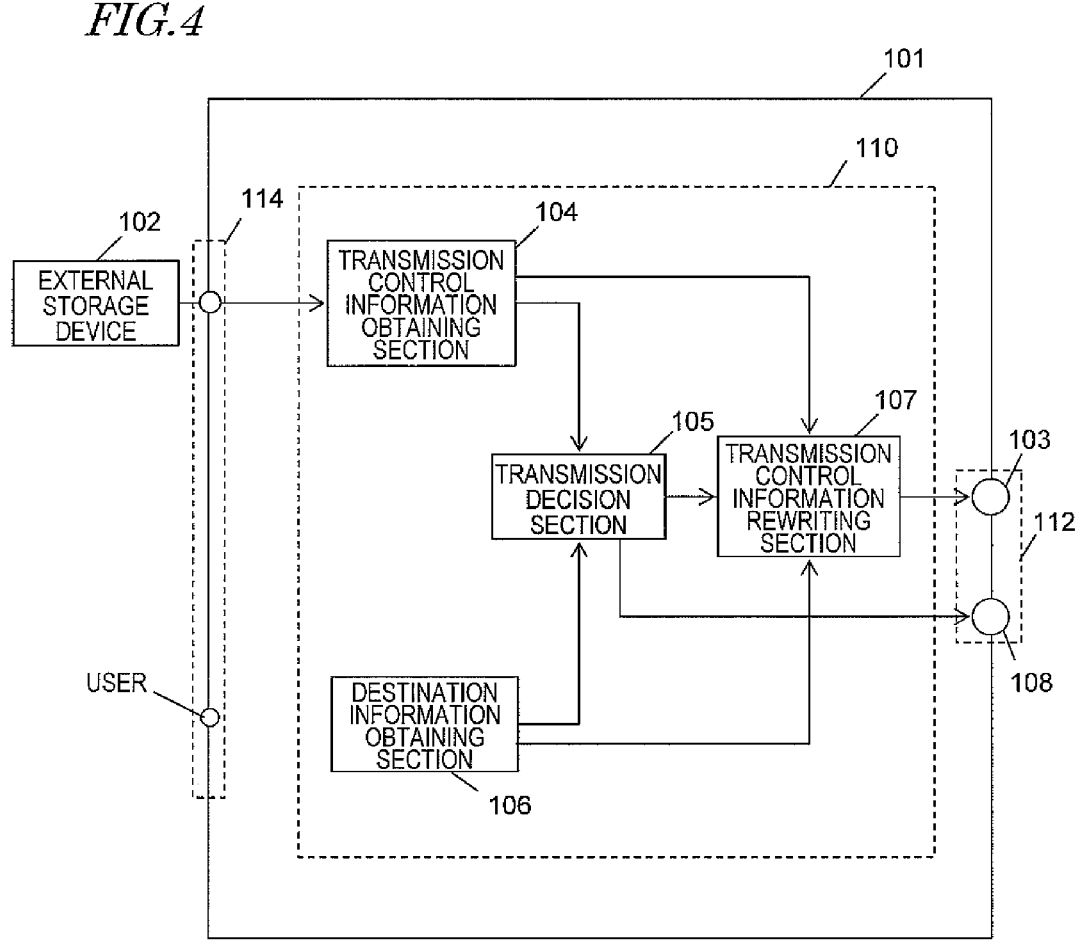
FIG. 4 is a block diagram illustrating a configuration for a content transmitter according to the first embodiment.

FIG. 4 is a block diagram illustrating a configuration for a content transmitter according to this embodiment. The content transmitter 101 includes an input section 114 which obtains content and other necessary information, a control section 110 which controls transmission of the content, and an output section 103 which outputs the content to an external device.

The input section 114 is suitably implemented as a combination of a data input terminal and a keyboard or any other user interface which allows the user to enter his or her instruction. For example, the input section 114 includes a terminal through which the content data stored in the external storage device 102 is obtained, a terminal through which information (such as an IP address or a domain name) indicating the destination specified by the user is obtained, and a user interface such as a keyboard and an input screen.

The control section 110 includes a transmission control information obtaining section 104 which gets transmission control information from the content data received, a destination information obtaining section 106 which gets destination information that has been entered by the user, a transmission decision section 105 which decides, by reference to the transmission control information and the destination information, whether or not to transmit the content, and a transmission control information rewriting section 107 which rewrites the transmission control information if decision has been made that the content be transmitted. These functional sections are suitably implemented as a combination of a processor such as a digital signal processor (DSP) and a central processing unit (CPU) and a program stored on a storage medium (not shown). Alternatively, they may also be implemented as dedicated integrated circuits that are designed so as to perform the respective kinds of processing described above.

The output section 112 includes output terminals 103 and 108, through which the content (including the transmission control information) supplied from the control section 110 is transmitted to its destination over the network. Optionally, the output terminal 108 connected to the transmission decision section 105 and the output terminal 103 connected to the transmission control information rewriting section 107 may be the same output terminal.

In addition to these components, the content transmitter 101 may further include a graphic controller which controls what is presented on the display, a network controller which controls communications, a storage medium, a power supply and other elements. Those elements may be an appropriate combination of known elements.

1-2. Operation

The content transmitter 101 retrieves content including the transmission control information from the external storage device 102 and determines, by reference to the transmission control information, whether the content may be transmitted or not. If the answer is YES, the transmission decision section 105 outputs the content to the destination IP address through the output terminal 103. Otherwise, the transmission decision section 105 outputs a transmission refusal signal through the output terminal 108. Alternatively, the transmission decision section 105 may output no signals instead of outputting the transmission refusal signal. The transmission control information is used to control transmission of content. With the transmission control information, each individual content can be marked "transmission permitted" or "transmission prohibited" with respect to each of various casting methods including the unicast for transmitting content to only a single device, the multicast for transmitting content to a group of devices, and the broadcast for transmitting content to every device belonging to the same network (or the same sub-net). In addition, each individual content can be marked "transmission permitted" or "transmission prohibited" depending on whether the source and destination of the content belong to the same sub-net.

FIG. 5 shows an example of the transmission control information. As shown in FIG. 5, each piece of transmission control information according to this embodiment is six-bit information. In FIG. 5, shown are some examples of the transmission control information, which are represented as hexadecimal numbers, and their respective bit values. Each of those bit values of the transmission control information indicates whether transmission is permitted or not in those various modes of transmission. Specifically, the first three bits of the transmission control information are pieces of information about a situation where content is supposed to be transmitted within the same sub-net and indicate whether transmission is permitted or not in the cases of unicast, multicast and broadcast, respectively. On the other hand, the last three bits of the transmission control information are pieces of information about a situation where content is supposed to be transmitted to a different sub-net and indicate whether transmission is permitted or not in the cases of unicast, multicast and broadcast, respectively. As for any of these bits, "1 (one)" indicates that transmission is permitted and "0 (zero)" indicates that transmission is prohibited.

In the table shown in FIG. 5, "0x" indicates that this is a hexadecimal number. For example, if only unicast within the same sub-net is permitted and transmission in any other mode is prohibited, then only the first bit becomes "1" and the other bits become "0", and therefore, the transmission control information is represented as "0x20" in that case. On the other hand, if only broadcast to a different sub-net is prohibited and transmission in any other mode is permitted, then only the last bit becomes "0" and the other bits become "1", and therefore, the transmission control information is represented as "0x3e" in that case. The transmission control information could be set to be different values from the ones shown in FIG. 5.

Figure 6:
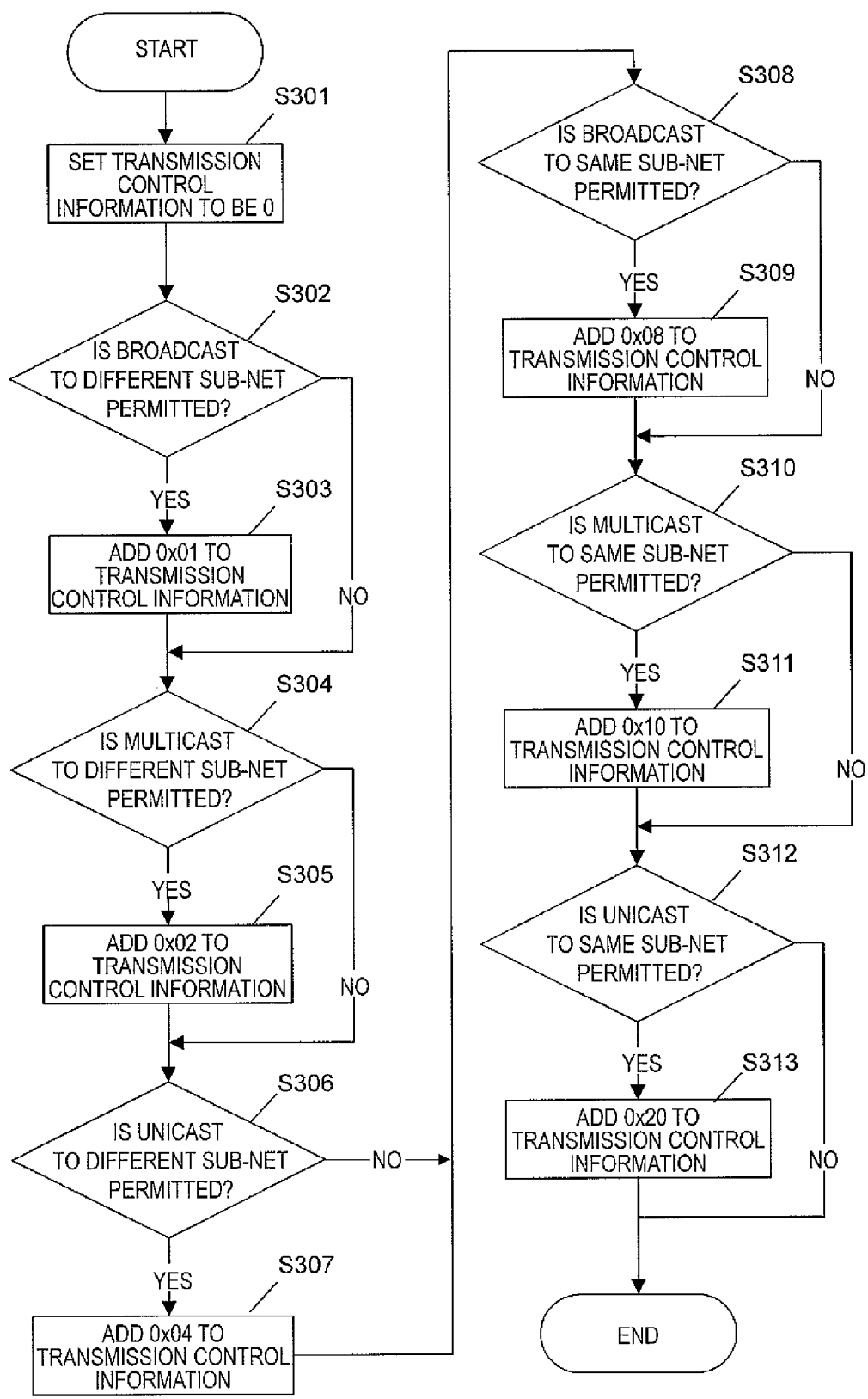
FIG. 6 is a flowchart showing an exemplary procedure of setting the transmission control information according to the first embodiment.

FIG. 6 is a flowchart showing an exemplary procedure of setting the transmission control information. The transmission control information may be set by a device (such as a camcorder or a PC) that has generated the content. Alternatively, after the content has been created, the transmission control information may be changed in accordance with the user's instruction.

In generating the transmission control information, first of all, in Step S301, the transmission control information is set to be "0". Next, in Step S302, a decision is made whether broadcast to a different sub-net is permitted or not. If the answer is YES, the process advances to Step S303, in which "0x01" (i.e., 000001) is added to the transmission control information. Otherwise, this processing step S303 is skipped. Next, in Step S304, a decision is made whether multicast to a different sub-net is permitted or not. If the answer is YES, the process advances to Step S305, in which "0x02" (i.e., 000010) is added to the transmission control information. Otherwise, this processing step S305 is skipped. Next, in Step S306, a decision is made whether unicast to a different sub-net is permitted or not. If the answer is YES, the process advances to Step S307, in which "0x04" (i.e., 000100) is added to the transmission control information. Otherwise, this processing step S307 is skipped. By performing these processing steps, settings can be made as to whether broadcast, multicast and unicast transmissions to a different sub-net are permitted or not.

Subsequently, settings are sequentially made as to whether broadcast, multicast and unicast transmissions to the same sub-net are permitted or not. Specifically, in Step S308, a decision is made whether broadcast to the same sub-net is permitted or not. If the answer is YES, the process advances to Step S309, in which "0x08" (i.e., 001000) is added to the transmission control information. Next, in Step S310, a decision is made whether multicast to the same sub-net is permitted or not. If the answer is YES, the process advances to Step S311, in which "0x10" (i.e., 010000) is added to the transmission control information. Subsequently, in Step S312, a decision is made whether unicast to the same sub-net is permitted or not. If the answer is YES, the process advances to Step S313, in which "0x20" (i.e., 1000000) is added to the transmission control information. By performing these processing steps, the transmission control information can be defined.

Next, it will be described how this content transmitter operates when the control section 101 transmits content.

The transmission control information obtaining section 104 gets the transmission control information from the content retrieved and outputs it to the transmission decision section 105 and the transmission control information rewriting section 107. The destination information obtaining section 106 outputs the destination IP address of the content that has been provided by an external device to the transmission decision section 105 and the transmission control information rewriting section 107. The transmission decision section 105 decides, based on the transmission control information and destination IP address provided, whether the given content may be transmitted or not. If the answer is YES, the transmission decision section 105 outputs the given content. Otherwise, the transmission decision section 105 outputs a transmission refusal signal through the output terminal 108. Optionally, the transmission decision section 105 may output no signals at all, instead of outputting the transmission refusal signal, as described above.

Based on the transmission control information and destination IP address provided, the transmission control information rewriting section 107 rewrites the transmission control information included in the given content and outputs the rewritten transmission control information. In this processing step, a different transmission control policy is applied according to the transmission mode of the content.

Figure 7:
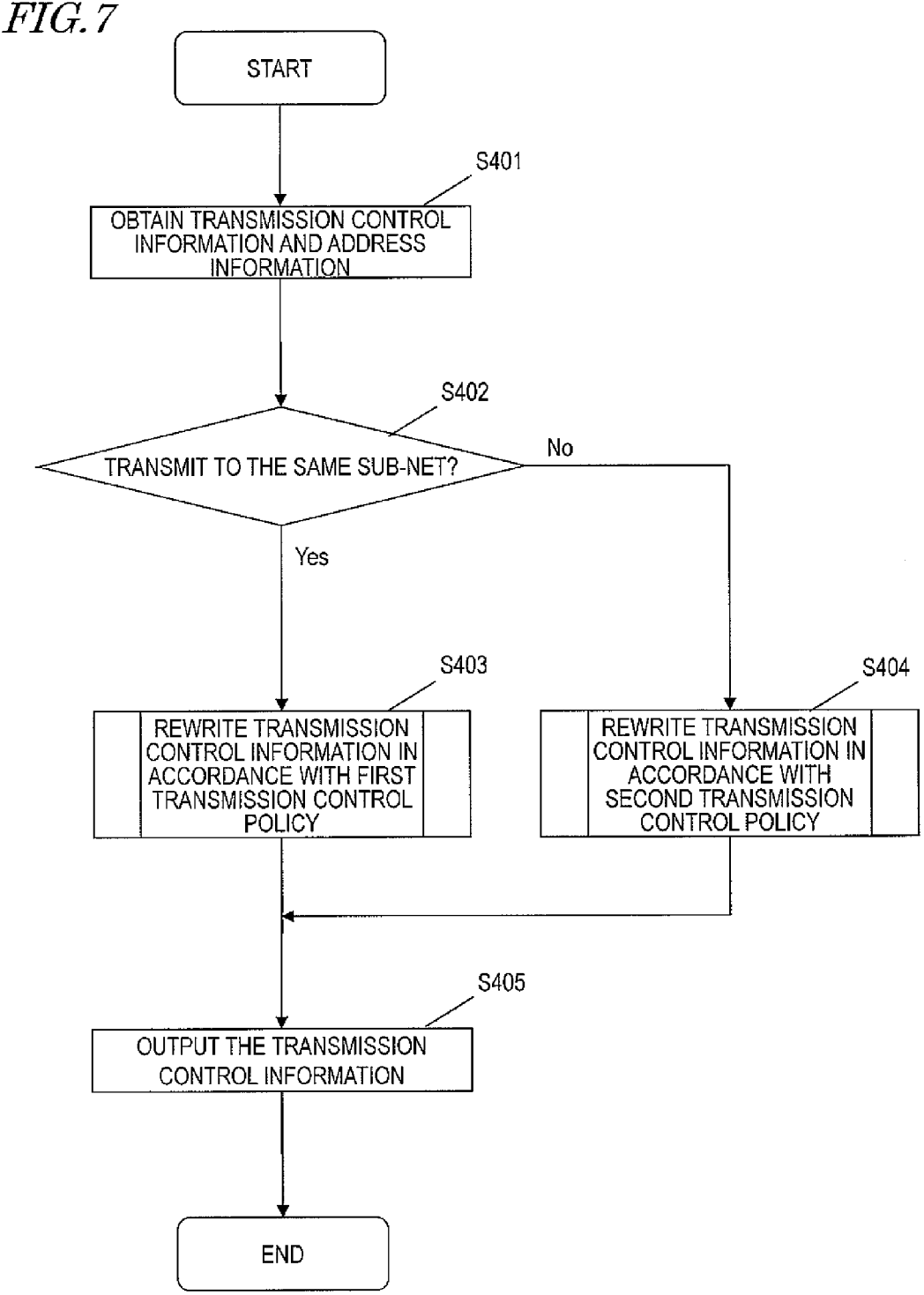
FIG. 7 is a flowchart outlining the procedure of transmission control information rewriting processing according to the first embodiment.

FIG. 7 is a flowchart outlining the processing to be carried out by the transmission control information rewriting section 107. First of all, the transmission control information rewriting section 107 gets transmission control information and destination IP address information (in Step S401). Next, by reference to the destination IP address, the transmission control information rewriting section 107 determines whether or not the content transmitter 101 that is the source of the content and the device on the receiving end belong to the same sub-net (in Step S402). If the decision is made that they belong to the same sub-net, the transmission control information rewriting section 107 rewrites the transmission control information in accordance with a first transmission control policy (in Step S403). On the other hand, if the decision is made that the device on the receiving end and the content transmitter 101 belong to mutually different sub-nets, then the transmission control information rewriting section 107 rewrites the transmission control information in accordance with a second transmission control policy (in Step S404). After that, the transmission control information rewriting section 107 outputs the transmission control information (in Step S405).

Figure 8:
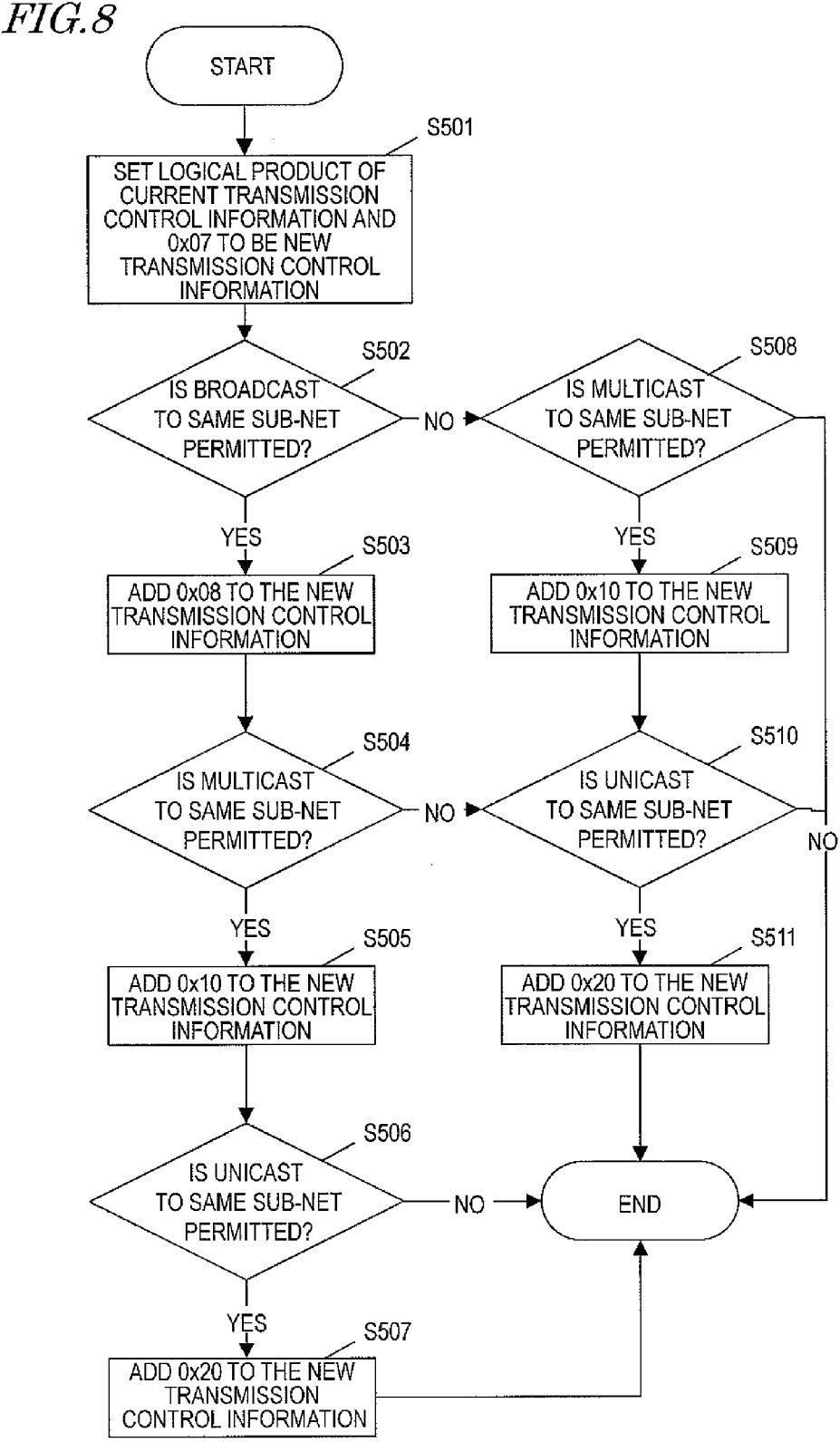
FIG. 8 is a flowchart showing the procedure of determining transmission control information that has been rewritten in a situation where content is transmitted to the same sub-net according to the first embodiment.

FIG. 8 is a flowchart showing how the transmission control information is rewritten in the processing step S403 in accordance with the first transmission control policy. Under this transmission control policy, the transmission control information that has been rewritten with respect to two different sub-nets inherits the previous transmission control information with respect to those different sub-nets. On the other hand, the transmission control information that has been rewritten with respect to the same sub-net is determined depending on whether the content to transmit is unicast-only content or else. If the content to transmit is unicast-only content with respect to the same sub-net (i.e., if the first three bits of the transmission control information is "100"), no secondary transmission to the same sub-net is permitted. Thus, the first bit indicating whether or not unicast transmission to the same sub-net is permitted is rewritten from "1" into "0". This measure is taken following the policy that content that may only be unicast to the same sub-net may not be transmitted to any device other than the target device. As for any other kind of content, however, the previous transmission control information with respect to the same sub-net is inherited. This measure is taken because content that may be multicast or broadcast to the same sub-net should maintain that state even after the transmission.

It will be described specifically in what procedure the transmission control information rewriting processing shown in FIG. 8 is carried out. First of all, the transmission control information rewriting section 107 defines the logical product of the current transmission control information and a bit string "0x07" (i.e., "000111") to be new transmission control information (in Step S501). As a result, the upper three bits are set to be "000" and the lower three bits remain the same as the previous information. Next, the transmission control information rewriting section 107 determines whether broadcast to the same sub-net as described in the previous transmission control information is permitted or not (in Step S502). If the decision is made that broadcast to the same sub-net is permitted, the process advances to Step S503, in which "0x08" (i.e., "001000") is added to the new transmission control information. After that, by performing the processing steps S504 through S507, S510 and S511, the contents of the previous transmission control information are maintained. On the other hand, if the decision is made in Step S502 that broadcast to the same sub-net is prohibited, then the transmission control information rewriting section 107 determines in Step S508 whether or not multicast to the same sub-net is permitted. If the answer is NO, then the process ends, because unicast to the same sub-net should be prohibited, no matter whether unicast to the same sub-net is permitted or not as per the previous transmission control information. On the other hand, if the answer to the query of the processing step S508 is YES, then the series of processing steps S509 through S511 are carried out and the same contents as the previous ones are maintained.

FIG. 9 is a flowchart showing how the transmission control information is rewritten in the processing step S403 shown in FIG. 7 in accordance with the second transmission control policy. Under this transmission control policy, no secondary transmission from the destination of the content to a different sub-net is permitted. Also, if the device on the receiving end of the content makes a secondary transmission to the same sub-net that the destination of the content belongs to, then the transmission control information is determined depending on whether the content to transmit is unicast-only content or else. If the content to transmit is unicast-only content, no secondary transmission is permitted. Otherwise, the contents of the transmission control information are set to be the same as those of the transmission control information to different sub-nets at the source of the content.

It will be described specifically in what procedure the transmission control information rewriting processing shown in FIG. 9 is carried out. First of all, the transmission control information rewriting section 107 sets the transmission control information to be zero (i.e., "000000") in Step S601. Next, the transmission control information rewriting section 107 determines whether broadcast to different sub-nets as described in the previous transmission control information is permitted or not (in Step S602). If the decision is made that broadcast to the same sub-net is permitted, the process advances to Step S603, in which "0x08" (i.e., "001000") is added to the new transmission control information. After that, by performing the processing steps S604 through S607, S610 and S611, the contents of the previous transmission control information about transmission to different sub-nets are set to be the transmission control information about transmission to the same sub-net. On the other hand, if the decision is made in Step S602 that broadcast to different sub-nets is prohibited, then the process advances to Step S608, in which the transmission control information rewriting section 107 determines whether or not multicast to different sub-nets is permitted. If the answer is NO, then the process ends, because unicast to the same sub-net should be prohibited, no matter whether unicast to different sub-nets is permitted or not as per the previous transmission control information. On the other hand, if the answer to the query of the processing step S608 is YES, then the series of processing steps S609 through S611 are carried out and the contents of the previous transmission control information about transmission to different sub-nets are set to be the transmission control information about transmission to the same sub-net.

Hereinafter, some specific examples of the content transmitting operation by the content transmitter 101 of this embodiment will be described along the time axis.

Example 1

It will be described how the content transmitter 101 operates in a situation where the transmission control information of the content stored in the external storage device 102 is "0x20", the IP address and sub-net mask of the content transmitter 101 are "192.168.0.1/255.255.255.0", and the IP address of the content destination provided by the destination information obtaining section 106 is "192.168.0.2".

First of all, the transmission control information obtaining section 104 reads the content from the external storage device 102, gets the transmission control information of that content, and outputs it to the transmission decision section 105 and the transmission control information rewriting section 107. Meanwhile, the destination information obtaining section 106 outputs the destination IP address that has been entered externally to the transmission decision section 105 and the transmission control information rewriting section 107.

Next, the transmission decision section 105 determines, based on the transmission control information, the content transmitter's (101) IP address and sub-net mask that have been provided by the transmission control information obtaining section 104 and the destination IP address provided by the destination information obtaining section 106, whether the content may be transmitted or not. In this case, since the IP address and sub-net mask of the content transmitter 101 are "192.168.0.1/255.255.255.0" and the destination IP address is "192.168.0.2", the content transmitter 101 and the content destination belong to the same sub-net. Also, since the transmission control information of the content that has been read out is "0x20", that content may be unicast to the same sub-net. That is why the transmission decision section 105 outputs that content without outputting a transmission refusal signal through the output terminal 108. Based on the IP address and sub-net mask of the content transmitter 101 and the destination IP address provided by the destination information obtaining section 106, the transmission control information rewriting section 107 decides that the content transmitter 101 and the content destination belong to the same sub-net, rewrites the transmission control information of the content provided by the transmission decision section 105 into "0x00" following the procedure shown in FIG. 8, and outputs the content through the output terminal 103.

Example 2

Next, it will be described how the content transmitter 101 operates in a situation where the transmission control information of the content stored in the external storage device 102 is "0x3f", the IP address and sub-net mask of the content transmitter 101 are "192.168.0.1/255.255.255.0", and the IP address of the content destination provided by the destination information obtaining section 106 is "192.168.0.255" that is the broadcast address to the same sub-net as the one that the content transmitter 101 belongs to.

First of all, the transmission control information obtaining section 104 reads the content from the external storage device 102, gets the transmission control information of that content, and outputs it to the transmission decision section 105 and the transmission control information rewriting section 107. Meanwhile, the destination information obtaining section 106 outputs the destination IP address that has been entered externally to the transmission decision section 105 and the transmission control information rewriting section 107.

Next, the transmission decision section 105 determines, based on the transmission control information, the content transmitter's (101) IP address and sub-net mask that have been provided by the transmission control information obtaining section 104 and the destination IP address provided by the destination information obtaining section 106, whether the content may be transmitted or not. In this case, since the IP address and sub-net mask of the content transmitter 101 are "192.168.0.1/255.255.255.0" and the destination IP address is "192.168.0.255" that is the broadcast address to the same sub-net, the content transmitter 101 and the content destination belong to the same sub-net. Also, since the transmission control information of the content that has been read out is "0x3f", the content that has been read may be transmitted in any case. That is why the transmission decision section 105 outputs that content without outputting a transmission refusal signal through the output terminal 108. Based on the IP address and sub-net mask of the content transmitter 101 and the destination IP address provided by the destination information obtaining section 106, the transmission control information rewriting section 107 decides that the content transmitter 101 and the content destination belong to different sub-nets, and outputs the content through the output terminal 103 without rewriting the transmission control information of the content provided by the transmission decision section 105 following the procedure shown in FIG. 9.

Example 3

It will be described how the content transmitter 101 operates in a situation where the transmission control information of the content stored in the external storage device 102 is "0x00", the IP address and sub-net mask of the content transmitter 101 are "192.168.0.1/255.255.255.0", and the IP address of the content destination provided by the destination information obtaining section 106 is "192.168.1.1".

First of all, the transmission control information obtaining section 104 reads the content from the external storage device 102, gets the transmission control information of that content, and outputs it to the transmission decision section 105 and the transmission control information rewriting section 107. Meanwhile, the destination information obtaining section 106 outputs the destination IP address that has been entered externally to the transmission decision section 105 and the transmission control information rewriting section 107.

Next, the transmission decision section 105 determines, based on the transmission control information, the content transmitter's (101) IP address and sub-net mask that have been provided by the transmission control information obtaining section 104 and the destination IP address provided by the destination information obtaining section 106, whether the content may be transmitted or not. In this case, since the IP address and sub-net mask of the content transmitter 101 are "192.168.0.1/255.255.255.0" and the destination IP address is "192.168.1.1", the content transmitter 101 and the content destination belong to different sub-nets. Also, since the transmission control information of the content that has been read out is "0x00", that content may never be transmitted. That is why the transmission decision section 105 outputs a transmission refusal signal through the output terminal 108.

Example 4

Finally, it will be described how the content transmitter 101 operates in a situation where the transmission control information of the content stored in the external storage device 102 is "0x3e", the IP address and sub-net mask of the content transmitter 101 are "192.168.0.1/255.255.255.0", and the IP address of the content destination provided by the destination information obtaining section 106 is "224.1.1.1" that is a multicast address of a different sub-net from that of the content transmitter 101.

First of all, the transmission control information obtaining section 104 reads the content from the external storage device 102, gets the transmission control information of that content, and outputs it to the transmission decision section 105 and the transmission control information rewriting section 107. Meanwhile, the destination information obtaining section 106 outputs the destination IP address that has been entered externally to the transmission decision section 105 and the transmission control information rewriting section 107.

Next, the transmission decision section 105 determines, based on the transmission control information, the content transmitter's (101) IP address and sub-net mask that have been provided by the transmission control information obtaining section 104 and the destination IP address provided by the destination information obtaining section 106, whether the content may be transmitted or not. In this case, since the IP address and sub-net mask of the content transmitter 101 are "192.168.0.1/255.255.255.0" and the destination IP address is "224.1.1.1" that is a multicast address of a different sub-net, the content transmitter 101 and the content destination belong to different sub-nets. Also, since the transmission control information of the content that has been read out is "0x3e", the content that has been read may be multicast to different sub-nets. That is why the transmission decision section 105 outputs that content without outputting a transmission refusal signal through the output terminal 108. Based on the IP address and sub-net mask of the content transmitter 101 and the destination IP address provided by the destination information obtaining section 106, the transmission control information rewriting section 107 decides that the content transmitter 101 and the content destination belong to different sub-nets, rewrites the transmission control information of the content provided by the transmission decision section 105 into "0x30" following the procedure shown in FIG. 9, and outputs the content through the output terminal 103.

1-3. Effects

As described above, the content transmitter 101 includes: an input section 114 which obtains transmission control information (corresponding to a first kind of information) and destination IP address (corresponding to a second kind of information) which are included in the content; a control section 110 which determines, by reference to the transmission control information and the destination IP address, whether or not to transmit the content, rewrites the transmission control information according to the destination if the content should be transmitted, and outputs the content; and an output section 112 which outputs the content including the transmission control information that has been rewritten. As a result, content can transmitted safely and securely without permitting secondary transmission of the content more than necessarily.

The transmission control information of this embodiment includes information indicating whether or not transmission of the content is permitted in a situation where the destination and the content transmitter 101 itself belong to the same sub-net and in a situation where the destination and the content transmitter 101 itself belong to two different sub-nets. Thus, the transmission control information can be rewritten flexibly according to the sub-net of the destination.

Particularly, the transmission control information of this embodiment is a piece of information indicating whether or not transmission of the content is permitted depending on whether the destination and the content transmitter 101 belong to the same sub-net or not and on which of unicast, multicast and broadcast should be adopted as the transmission method. And the control section 110 determines, based on the IP address of the destination, whether the destination and the content transmitter 101 belong to the same sub-net or not and which of unicast, multicast and broadcast should be adopted as the transmission method, thereby deciding whether the content may be transmitted or not. As a result, the transmission control can be carried out flexibly according to each combination of destination sub-net and transmission method, and communications can get done more safely and securely.

Other Embodiments

Although Embodiment 1 has been described herein as just an example of the present disclosure, various modifications, replacements, additions or omissions can be readily made on that embodiment as needed and the present disclosure is intended to cover all of those variations. Also, a new embodiment can also be created by combining respective elements that have been described for that embodiment disclosed herein.

Thus, some of those various other embodiments will be described as an example.

In the first embodiment described above, the transmission control policy following the procedures shown in FIGS. 8 and 9 is supposed to be adopted. However, this is only an example. Rather the transmission control policy may be defined arbitrarily.

Also, even though the transmission control information is supposed to be a six-bit value according to the first embodiment described above, this is just an example, too. For example, the casting methods (transmission methods) available may consist of only unicast and broadcast or the network types may be limited to the same sub-net. In that case, the transmission control information is represented as a value of less than six bits. In any case, the transmission control information has only to include information indicating whether or not transmission is permitted when the transmission method is at least one of unicast, multicast and broadcast.

Furthermore, the content transmitter 101 is not necessarily configured to make communications in accordance with the TCP/IP protocol. If the content transmitter 101 makes communications in accordance with any other communication protocol, addresses other than IP addresses will be used as the destination information (corresponding to the second kind of information). For example, in a network that uses a telephone line, a given network may be identified by the local code of the phone number. Even in such a network, the technique of the present disclosure is also applicable to controlling FAX transmission, for example.

Furthermore, even though the content is supposed to include video according to the first embodiment described above, this is only an example, too. The technique of the present disclosure is also applicable to transmitting any other kind of content, of which the transmission should be controlled (such as a confidential document). Moreover, the technique of the present disclosure is applicable to communicating not only between departments in the same TV station but also departments in any other general company as well.

The technique of the present disclosure is also applicable to a software program that defines the processing of the embodiments described above. The operations defined by such a program may be as shown in FIGS. 6, 7, 8 and 9, for example. Such a program may be not only distributed by being stored on a removable storage medium but also downloaded through telecommunications lines. The various kinds of operations that have been described for the embodiments can get done by making a processor built in an apparatus execute such a program.

Various embodiments of the present disclosure have been described by providing the accompanying drawings, and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the present disclosure. Therefore, please do not make a superficial decision that those inessential additional elements are indispensable ones simply because they are illustrated or mentioned on the drawings or the description.

Also, the embodiments disclosed herein are just an example of the present disclosure, and therefore, can be subjected to various modifications, replacements, additions or omissions as long as those variations fall within the scope of the present disclosure as defined by the appended claims and can be called equivalents.

According to the technique of the present disclosure, when content is going to be transmitted over a network, the transmission control policy of the source is also applicable to the destination, thus avoiding secondary transmission to unexpected devices. Thus, the technique of the present disclosure can be used in various applications that require transmission control of content.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-052669 filed Mar. 9, 2012 and No. 2012-276723 filed Dec. 19, 2012, the entire contents of which are hereby incorporated by reference.

What is claimed is:

1. A content transmitter that transmits content over a network, the content transmitter comprising:
    an input section configured to obtain the content, a first kind of information indicating, based on the destination and transmission method of the content, whether transmission of the content is permitted or not, and a second kind of information specifying the destination of the content;
    a control section configured to determine, by reference to the first and second kinds of information, whether or not to transmit the content to the destination and rewrites the first kind of information; and
    an output section configured to output the content and the first kind of information that has been rewritten, wherein:
    the first kind of information represents a range of permitted recipients, indicating that the content may or may not be transmitted depending on whether or not the destination and the content transmitter belong to the same sub-net and on which of unicast, multicast and broadcast is adopted as the transmission method;
    the second kind of information is an IP address; and
    the control section determines, based on the IP address of the destination, whether or not the destination and the content transmitter belong to the same sub-net and which of unicast, multicast and broadcast is adopted as the transmission method, and, based on the IP address and the first kind of information, decides whether or not to transmit the content to the destination and, when the destination and the content transmitter belong to the same sub-net and when the first kind of information permits unicast to the same sub-net and prohibits multicast and broadcast to the same sub-net rewrites the first kind of information so as to prohibit the transmission of the content to the same sub-net.

2. The content transmitter of claim 1, wherein when the control section transmits the content by broadcast, when the destination and the content transmitter belong to the same sub-net, and when the first kind of information permits broadcast to the same sub-net, the control section does not rewrite the first kind of information.

3. The content transmitter of claim 1, wherein when the control section transmits the content and when the destination and the content transmitter belong to the same sub-net, the control section maintains information about different sub-nets that is included in the first kind of information.

4. The content transmitter of claim 1, wherein when the control section transmits the content, when the destination and the content transmitter belong to two different sub-nets, and when the first kind of information permits unicast to different sub-nets but prohibits multicast and broadcast to the different sub-nets, the control section rewrites the first kind of information so as to prohibit unicast, multicast and broadcast to the same sub-net.

5. The content transmitter of claim 1, wherein when the control section transmits the content and when the destination and the content transmitter belong to two different sub-nets, the control section rewrites the first kind of information so as to prohibit unicast, multicast and broadcast to different sub-nets.

6. The content transmitter of claim 1, wherein the content and the first kind of information are managed as a single aggregated file.

7. The content transmitter of claim 1, wherein the content includes video.

8. A method for transmitting content over a network, the method comprising the steps of:
  obtaining the content and a first kind of information indicating, based on at least one of the destination and transmission method of the content, whether transmission of the content is permitted or not, wherein the first kind of information represents a range of permitted recipients, indicating that the content may or may not be transmitted depending on whether or not the destination and the content transmitter belong to the same sub-net and on which of unicast, multicast and broadcast is adopted as the transmission method;
  obtaining a second kind of information that is an IP address specifying the destination of the content;
  determining, based on the IP address of the destination, whether or not the destination and the content transmitter belong to the same sub-net and which of unicast, multicast and broadcast is adopted as the transmission method;
  determining, based on the IP address and the first kind information, whether or not to transmit the content to the destination;
  rewriting, when the destination and the content transmitter belong to the same sub-net and the first kind of information permits unicast to the same sub-net and prohibits multicast and broadcast to the same sub-net, the first kind of information so as to indicate the transmission of the content to the same sub-net is prohibited; and
  outputting the content and the first kind of information that has been rewritten.

9. A non-transitory computer-readable medium storing a computer program to be executed by a computer embedded in a content transmitter that transmits content over a network, the program causing the computer to execute:
  obtaining the content and a first kind of information indicating, based on at least one of the destination and transmission method of the content, whether transmission of the content is permitted or not, wherein the first kind of information represents a range of permitted recipients, indicating that the content may or may not be transmitted depending on whether or not the destination and the content transmitter belong to the same sub-net and on which of unicast, multicast and broadcast is adopted as the transmission method;
  obtaining a second kind of information that is an IP address specifying the destination of the content;
  determining, based on the IP address of the destination, whether or not the destination and the content transmitter belong to the same sub-net and which of unicast, multicast and broadcast is adopted as the transmission method;
  determining, based on the IP Address and the first kind information, whether or not to transmit the content to the destination;
  rewriting, when the destination and the content transmitter belong to the same sub-net and the first kind of information permits unicast to the same sub-net and prohibits multicast and broadcast to the same sub-net, the transmission of the content to the same sub-net is prohibited; and
  outputting the content and the first kind of information that has been rewritten.

10. A content transmitter that transmits content over a network, the content transmitter comprising:
  an input section configured to obtain the content, a first kind of information indicating, based on the destination and transmission method of the content, whether transmission of the content is permitted or not, and a second kind of information specifying the destination of the content;
  a control section configured to determine, by reference to the first and second kinds of information, whether or not to transmit the content to the destination and rewrites the first kind of information; and
  an output section configured to output the content and the first kind of information that has been rewritten, wherein:
  the first kind of information represents a range of permitted recipients, indicating that the content may or may not be transmitted depending on whether or not the destination and the content transmitter belong to the same sub-net and on which of unicast, multicast and broadcast is adopted as the transmission method;
  the second kind of information is an IP address; and
  the control section determines, based on the IP address of the destination, whether or not the destination and the content transmitter belong to the same sub-net and which of unicast, multicast and broadcast is adopted as the transmission method, and, based on the IP address and the first kind of information, decides whether or not to transmit the content to the destination and, when the destination and the content transmitter belong to two different sub-nets and when the first kind of information permits unicast to different sub-nets and prohibits multicast and broadcast to the different sub-nets, rewrites the first kind of information so as to prohibit the transmission of the content.

* * * * *